United States Patent

Smithberger et al.

[11] Patent Number: 5,551,534
[45] Date of Patent: Sep. 3, 1996

[54] PRESSURE BALANCED BRAKE STACK

[75] Inventors: Joe E. Smithberger, Canton; Thomas E. Nemcheck, Uniontown; Kamran Z. Moradi, Fairlawn; John M. Hall, Uniontown, all of Ohio

[73] Assignee: Aircraft Braking Systems Corp., Akron, Ohio

[21] Appl. No.: 461,353

[22] Filed: Jun. 5, 1995

[51] Int. Cl.⁶ ............................................. F16D 55/02
[52] U.S. Cl. .................... 188/71.5; 188/71.7; 188/250 B
[58] Field of Search .................... 188/71.3, 71.5, 188/71.6, 71.7, 218 XL, 250 B; 192/70.19, 70.2, 70.21

[56] References Cited

U.S. PATENT DOCUMENTS

| | | | |
|---|---|---|---|
| 4,613,017 | 9/1986 | Bok ................................. | 188/218 XL |
| 4,878,563 | 11/1989 | Badeu et al. ..................... | 188/71.5 |
| 5,295,560 | 3/1994 | Moseley ........................... | 188/71.5 |
| 5,323,880 | 6/1994 | Wells et al. ...................... | 188/250 B |

FOREIGN PATENT DOCUMENTS

| | | | |
|---|---|---|---|
| 2004091 | 5/1990 | Canada ............................... | 188/71.5 |
| 2164712 | 3/1986 | United Kingdom ................. | 188/71.6 |
| 9109233 | 6/1991 | WIPO .................................. | 188/71.5 |

*Primary Examiner*—Robert J. Oberleitner
*Assistant Examiner*—Chris Schwartz
*Attorney, Agent, or Firm*—Renner, Kenner, Greive, Bobak, Taylor & Weber

[57] ABSTRACT

A pressure balanced brake disc stack provides brake discs of greater thickness at the ends and center of the stack and of a lesser thickness at the areas in between the centrally disposed disc and the discs at the end of the stack. The increased thickness of the discs at the end of the stack prevent deflection or distortion of those discs to more evenly distribute the braking pressure applied thereto throughout the stack so as to provide a higher braking coefficient. Additionally, the unique configuration of the brake stack allows for effective heat dissipation at the discs adjacent to the end discs of the stack.

15 Claims, 1 Drawing Sheet

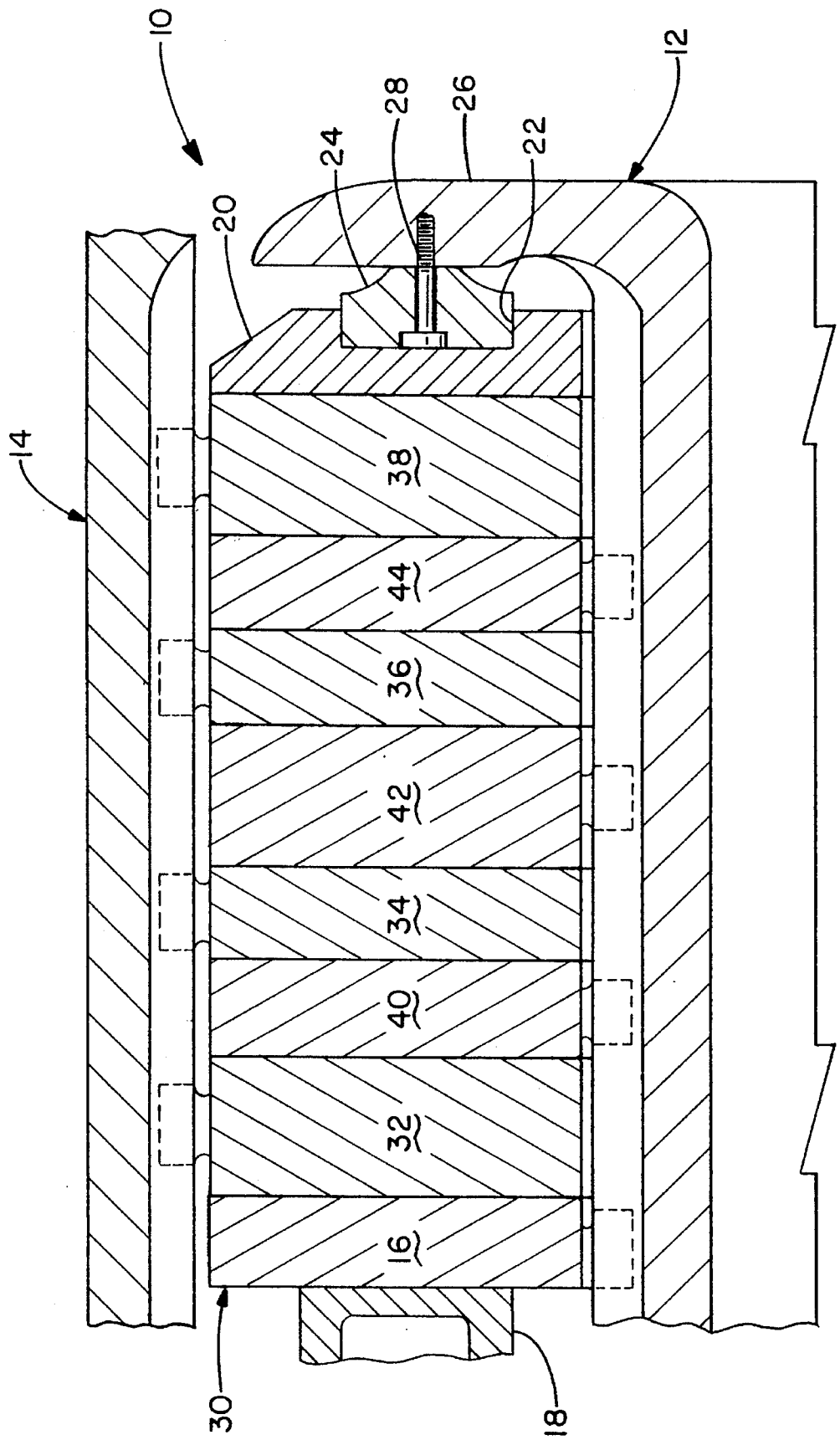

PRESSURE BALANCED BRAKE STACK

TECHNICAL FIELD

The invention herein resides in the art of braking systems for vehicles. More particularly, the invention relates to braking systems for aircraft. Specifically, the invention presents a pressure balanced brake disc stack to provide an improved braking coefficient for carbon braking systems for aircraft.

BACKGROUND ART

It is well known that aircraft typically employ braking systems having brake disc stacks formed from a plurality interleaved discs. The discs are alternately splined to a wheel and torque tube such that alternating rotor and stator discs are present within the stack. A stationary end plate is provided at one end of the stack and is supported by a plurality of stationary fingers. An axially movable pressure plate is provided at the opposite end and is moved by a plurality of pressure pistons. The application of force to the pressure plate urges the stator and rotor discs into frictional engagement with each other, providing the necessary braking action for the aircraft.

Presently known aircraft brake discs are made of steel, carbon, or appropriate composites. Regardless of the type of material employed, tremendous heat is generated in the brake disc stack during a landing operation. It is well known that excessive heat within a vehicle braking system is generally harmful to the system. It is further well known that certain braking materials such as carbon and composites are desired for their light weight and thermal properties. However, such carbon and composite materials are quite expensive, far exceeding the cost of steel. Accordingly, there is a need when employing such materials to maximize material usage. In order to improve upon standard braking systems which have stators and rotors of equal thicknesses, U.S. Pat. Nos. 4,613,017 and 4,742,895 generally teach that thick rotors used in combination with thin stators or thin rotors in combination with thick stators, combined with an intermediate overhaul technique, can improve material (carbon) utilization. Furthermore, U.S. Pat. No. 5,295,560 teaches that a plurality of thick rotors and stators grouped in the middle of a brake stack with a plurality of thin rotors and stators grouped at each end of the brake stack will improve carbon utilization while more evenly distributing heat than in other such brake assemblies. By more quickly and evenly distributing heat throughout the braking system, aircraft are permitted to return to operation in a shorter period of time.

Generally, it is known that the braking system disclosed in the aforementioned U.S. Pat. No. 5,295,560 provides improved cooling characteristics for vehicle braking systems. Typically, brake discs begin to cool immediately following landing. However, heat is not dissipated as quickly as desired because braking operations incident to taxiing retard any cooling effect. Modern materials such as carbon and other composites are employed to withstand the high braking temperatures encountered, but safety considerations preclude use of the aircraft following landing for a sufficient period of time to allow the brake discs to cool below a predetermined temperature.

In the aircraft industry, each aircraft has a characteristic turnaround or ground waiting time. This is the time required for the hottest brake disc in the brake disc stack to cool below a specific temperature. For example, it is generally desired that the temperature of the hottest brake disc be below the ignition point of the hydraulic brake fluid prior to takeoff. Therefore, the turnaround time characteristic is a function of the aircraft landing speed, mass, brake system characteristics, taxiing procedures, and the like. As such, the more time it takes for the brakes to cool, the more costly it is for the airlines as the aircraft sit idle.

When using certain carbon or composite braking materials, it has been found that the brake discs may actually distort or axially deflect when force is effected between the pressure plate and end plate. Specifically, in the thermally balanced brake having thin rotors adjacent both the pressure plate and end plate, it has been found that such discs of certain materials achieve less than optimum braking efficiency as a result of such distortion or deflection precluding uniform forceful engagement of the disc interfaces. In order to maximize braking efficiency it is desirable to evenly distribute force or pressure across the disc interfaces throughout the stack while still allowing the stack to quickly cool to reduce aircraft turnaround times.

DISCLOSURE OF INVENTION

In light of the foregoing, it is a first aspect of the invention to provide a brake disc stack for an aircraft which is pressure balanced.

Another aspect of the invention is the provision of a brake disc stack for an aircraft which is geometrically configured to optimize pressure distribution while maintaining desirable heat dissipation performance.

Still a further aspect of the invention is the provision of a brake disc stack for an aircraft wherein the thickness of each disc is a function of how to best distribute pressure.

Another aspect of the invention is the provision of a pressure balanced brake disc stack which is conducive to periodic servicing changes and interchanges of the discs which improve material utilization.

An additional aspect of the invention is the provision of a pressure balanced brake disc stack which is reliable and durable in operation, while being conducive to implementation with state of the art materials and systems.

The foregoing and other aspects of the invention which will become apparent as the detailed description proceeds are achieved by a pressure balanced brake disc stack, comprising: a plurality of rotor discs; a plurality of stator discs interleaved with said rotor discs; a pressure plate at a first end of said stack; an end plate at a second end of said stack; and wherein a rotor disc at each of said first and second ends is thicker than said stator and rotor discs adjacent thereto such that during braking operations employing said brake disc stack, said rotor disc at each of said first and second ends will deflect less and distribute pressure more uniformly through the stack than if said end rotor discs were as thin as said stator and rotor discs disposed adjacent thereto.

Yet further aspects of the invention are attained by a brake disc stack, comprising: a first rotor disc at a first end of the stack; a second rotor disc at a second end of the stack; a plurality of additional rotor discs disposed between said first and second ends; a plurality of stator discs disposed between said first and second ends; a first stator disc apart from said plurality of stator discs disposed between said plurality of rotor discs, wherein said rotor and stator discs are interleaved, said first and second rotor discs are thicker than said plurality of said rotor discs and said plurality of stator discs; and said first stator disc is thicker than said first and second rotor discs, such that during braking operations employing the brake disc stack, said first and second rotor discs will distribute pressure more evenly within the brake disc stack than if said first and second rotor discs were as thin as said plurality of rotor discs.

BRIEF DESCRIPTION OF DRAWING

For a complete understanding of the objects, techniques and structure of the invention reference should be made to the following detailed description and accompanying drawing wherein a cross sectional view of a pressure balanced brake disc stack according to the invention may be seen.

BEST MODE FOR CARRYING OUT THE INVENTION

Applicants have found that during braking operations thin brake discs located adjacent to the pressure forces of the braking system may not provide optimal pressure distribution. This has been found to be particularly true with respect to brakes of certain carbon material. Further, applicants have found that thicker brake discs located adjacent to the pressure application points will typically distribute pressure more uniformly than thin discs. As such, it has been found that where disc deflection or distortion is likely, higher braking coefficients are achieved when thicker brake discs are used at the ends of the stack near the pressure plate and end plate, since thick discs are less likely to deflect or distort than thin discs of the same material. It is also known that the amount and rate of thermal dissipation in a brake disc is dependent upon its mass and the positioning thereof. Accordingly, applicants desire to have thick brake discs proximately located to the pressure points to minimize distortion and deflection. Additionally, the applicants desire to have a centrally located thick brake disc for the purpose of minimizing heat build-up in the center of the stack. Finally, applicants propose thin discs interposed between the thick discs to enhance heat dissipation.

Referring now to the drawing, it can be seen that a brake disc system according to the invention is designated generally by the numeral 10. As shown, the system 10 includes a stationary torque tube assembly 12 and a rotating wheel assembly 14. Such structures are, of course, well known and understood by those skilled in the art. At one end of the system 10 is a pressure plate 16 movable axially with respect to the torque tube 12 upon the urging of appropriate brake pistons 18 or other braking forces. At the opposite end, it will be appreciated that an end plate 20 is fixed to the torque tube 12. The end plate 20 has recesses 22 for receiving puck assemblies 24. The puck assemblies 24 are affixed to the back plate 26 so as to maintain the alignment of the end plate 20 with a brake stack 30. The puck assemblies 24 are fastened to the back plate 26 via a bolt or other type fastening means 28. As such, the end plate 20 exerts a back pressure on the brake stack 30 due to the piston 18 pressure on the pressure plate 16. It will be appreciated by those skilled in the art that the pressure plate 16 and end plate 20 are preferably made of carbon.

A brake disc stack 30 is interposed between the pressure plate 16 and the end plate 20. As such, it will be appreciated that rotor discs 32–38 are splined or keyed to the rotary wheel assembly 14 to be rotational therewith about the stationary torque tube assembly 12. In a somewhat similar fashion, stator discs 40–44 are splined or otherwise keyed to the stationary torque tube assembly 12 and prevented from rotational movement. Those skilled in the art will readily understand that the rotor and stator discs 32–44 are adapted for axial movement with respect to the torque tube 12 and wheel assembly 14 and move in that manner under application of force applied through the pressure pistons 18 upon the pressure plate 16 to achieve the braking operation. Each of the discs 32–44 has a pair of friction surfaces for engagement with corresponding friction surfaces of the discs on either side thereof. In the preferred embodiment of the present invention, the inner faces of the end plate 20 and pressure plate 16 are also friction surfaces, participating in the brake operation. Of course, the actual braking force is generated at the frictional interfaces of the discs 16, 20, 32–44.

In a typical braking operation, application of the pistons 18 to the pressure plate 16 urges the rotor discs 32–38 and stator discs 40–44 into frictional contacting engagement with each other, and against the end plate 20. With the rotor discs 32–38 being splined and interconnected to the wheel assembly 14, and the stator discs 40–44 being splined to the torque tube 12, necessary braking operation is achieved. Such operation is standard with most aircraft braking systems.

As presented earlier, the brake discs located near the ends of the brake stack 30 are the first to have pressure impacted thereon. Therefore, it is imperative that they transfer force uniformly across the interface of the adjacent disc and throughout the stack 30. It is also important for the brake stack 30 to control heat build-up and dissipate heat efficiently. As revealed earlier, the discs nearer the center of the stack 30 typically cool slower than the discs nearer the pressure plate 16 and the end plate 20. The pressure and end plates are more exposed to convection cooling, and thermally connected to cooler portions of the wheel and brake assembly thus accounting for their noted higher cooling rates. The brake 10 has been configured to obtain both good pressure distribution and heat transfer, as will become apparent below.

To maximize pressure distribution and attain good heat dissipation characteristics of the brake disc system 10, the discs 32 and 38 which are at the end of the stack 30 are thicker than the discs 34, 36, 40, and 44 located therebetween. Additionally, the centrally disposed stator disc 42 is thicker than the rotor discs 32 and 38. This is consistent with the provision that stator discs have a smaller outside diameter than rotor discs and, accordingly, for stators and rotors to have substantially the same mass, the stators must be thicker than corresponding rotors. As will further become apparent below, the thick discs 32, 38, 42 have twice the wear thickness of the thin discs 34, 36, 40, 44. With the discs 32, 38 and 42 being thicker than the discs 34, 36, 40, and 44 it will be appreciated that the thicker discs have a larger mass than the thinner ones. Accordingly, during braking operations the thick end discs 32, and 38 do not deflect or distort, such that the force or pressure is uniformly distributed throughout the disc interfaces, thus increasing the braking coefficient of the stack 30 than if thin discs were used adjacent to the pressure plate 16 and the end plate 20. Additionally, during braking operation, the temperature of the stator disc 42 rises slower and, hence, to a lower level than the temperature of the adjacent discs 34, 36, 40, and 44 which are necessarily of a lower mass. It will be appreciated that these adjacent thinner discs disposed between the thick rotor discs 32 and 38 and the stator disc 42 will cool faster than the innermost disc 42. However, because of its greater mass, the disc 42 will typically rise to a lower temperature than the disc 42, such that the brake assembly 10 demonstrates some basic thermally balanced features.

It will be appreciated that in the embodiment shown in the drawing there are an odd number of discs in the system. As such, the brake disc stack 30 is symmetrically configured such that there are thick rotor discs at each end of the disc stack 30 and a thick stator disc centrally disposed therein. Included between each thick rotor disc and the centrally located stator disc are thinner rotor and stator discs. It will be understood that if another rotor/stator disc pair were added to the system, they could be located on either side of the thick stator disc 42. The added pair would be thick, thin, or a combination thereof, dependent upon the thermal and wear needs of the assembly.

It will be appreciated that the invention contemplates servicing of the disc stack 30 at the half life cycle of the thick discs 32, 38, 42. It is further contemplated that, at the half life cycle of the thick discs, such thick discs would be of a thickness approximating that of the thinner discs originally disposed between the thicker discs. In other words, when the thick discs wear down to one half of the wear allowance, they are then moved within the stack 30 to be used as thin discs. The thin discs are, at that time, discarded or combined and refurbished as thick discs until their full wear allowance has been used. In this manner, only the thick discs 32, 38, and 42 and one of the thin discs 40, 44 are replaced with a new disc at service cycles. The worn out thin discs are replaced with the worn thick discs which are, at that time, worn to the thickness of a "new" thin disc. For example, when the thick discs 32 and 38 are worn to an unacceptable level they are removed and placed in the previous positions of thin rotor discs 34 and 36 respectively. Likewise, after the thick stator disc 42 has become worn, it is put in the position of thin stator discs 40 or 44. The other worn stator disc 44 or 40 is replaced with a new one. Accordingly, each "build" of the stack 30 is the same.

In a preferred embodiment of the invention, the thick rotor discs 32 and 38 have a thickness of 1.110 inch. The thin rotor discs 34 and 36 have a thickness of 0.854 inch. It is known that the wear on each face of the discs of the stack is 0.108 inch after fifteen hundred (1500) landings. It is also known that when the thick rotor discs 32 and 38 are to be used as thin discs, they will be machined or "turned" an additional 0.020 inch on each face. Accordingly, each face is reduced by 0.128 inch with a total reduced thickness of 0.256 inch. It can thus be seen that the thick rotor discs 32 and 38 which began with a thickness of 1.110 inch then equal the thickness of a thin rotor disc 34 and 36 which is 0.854 inch, achieved by reducing or dressing the thick rotor disc by the 0.256 inch wear and machining levels.

In a similar manner, the thick stator disc is reduced in size to that of a thin stator disc. The thick stator disc 42 has a thickness of 1.206 inch, while the thin stator discs 40 and 44 have a thickness of 0.950 inch. As before, after fifteen hundred (1500) landings each face is worn 0.108 inch. After the thick stator disc 42 is dressed down 0.020 inch, each face of the stator disc 42 is reduced by 0.128 inch, such that the total thickness of the stator disc is reduced to 0.256 inch. Accordingly, it can be seen that the thick stator disc beginning at 1.206 inch, which is ultimately reduced by 0.256 inch, can then be used as a thin stator disc having a thickness of 0.950 inch.

In a preferred embodiment, each of the thick discs is designed to achieve three thousand landings, fifteen hundred landings as a thick disc, and an additional fifteen hundred landings as a thin disc. In other words, each of the faces is allowed to wear a predetermined amount "X" from braking operations. Each face of the disc also experiences a machining loss "Y" when the disc is moved at overhaul from a "thick" position to a "thin" one. Accordingly, each "thick" disc is provided with "X" plus "Y" wear thickness. Of course, disc thicknesses and sizes vary greatly over a range of aircraft presently in use.

While the specific ratio of the thickness of a thick disc to that of a corresponding thin disc varies as a function of the aircraft, it has been found that such ratio lies between 1.2:1 and 1.5:1. Accordingly, a thick rotor disc will be between 1.2 and 1.5 times the thickness of a thin rotor disc, and a thick stator disc will be between 1.2 and 1.5 times the thickness of a thin stator disc.

It should now be readily apparent to those skilled in the art that the concept of the invention is to place thick discs of greater mass near the ends of the brake stack to resist deflection and distortion to more evenly distribute pressure applied thereto. It is also the concept of the present invention to include a disc or discs of greater mass in the center of the brake disc stack with discs of lesser mass interposed between the thicker center discs and the thicker outer discs. This configuration allows the thicker outer discs to more evenly distribute pressure to the brake disc stack, while still allowing for effective heat dissipation.

Thus it can be seen that the objects of the invention have been satisfied by the structure and techniques presented herein. While in accordance with the patent statutes only the best mode and preferred embodiment of the invention have been presented and described in detail, the invention is not limited thereto or thereby. Accordingly, for an appreciation of the scope and breadth of the invention references should be made to the following claims.

What is claimed is:

1. A pressure balanced brake disc stack, comprising:
   a plurality of rotor discs;
   a plurality of stator discs interleaved with said rotor discs;
   a pressure plate at a first end of said stack;
   an end plate at a second end of said stack; and
   wherein a rotor disc at each of said first and second ends is thicker than said stator and rotor discs adjacent thereto such that during braking operations employing said brake disc stack, said rotor disc at each of said first and second ends will deflect less and distribute pressure more uniformly through the stack than if said end rotor discs were as thin as said stator and rotor discs disposed adjacent thereto.

2. The pressure balanced brake disc stack according to claim 1, wherein a stator disc is centrally disposed between said adjacent rotor discs that is thicker than said rotor disc at each of first and second ends such that the thinner adjacent stator and rotor discs will rise to a higher temperature and cool more quickly than said thicker centrally disposed stator disc and said rotor discs at each of first and second ends.

3. The pressure balanced brake disc stack according to claim 2, wherein said rotor discs at each of said first and second ends and said centrally disposed stator disc have a double wear thickness of said adjacent rotor and stator discs which have a single wear thickness.

4. The pressure balanced brake disc stack according to claim 3, wherein said rotor discs at each of said first and second ends and said centrally disposed stator disc further exceed a thickness of said adjacent rotor and stator discs by an amount allowing for dressing frictional surfaces of said rotor discs at each of said first and second ends and said centrally disposed stator disc after wear to serve as respective adjacent rotor and stator discs of said stack.

5. The pressure balanced brake disc stack according to claim 3, wherein a number of said thinner adjacent rotor and stator discs exceeds a number of said thicker rotor discs at each of said first and second ends and said thicker centrally disposed stator disc.

6. The pressure balanced brake disc stack according to claim 3, wherein said adjacent stators are thicker than said adjacent rotors.

7. A brake disc stack, comprising:

a first rotor disc at a first end of the stack;

a second rotor disc at a second end of the stack;

a plurality of additional rotor discs disposed between said first and second ends;

a plurality of stator discs disposed between said first and second ends;

a first stator disc apart from said plurality of stator discs disposed between said plurality of rotor discs, wherein said rotor and stator discs are interleaved, said first and second rotor discs are thicker than said plurality of said rotor discs and said plurality of stator discs; and said first stator disc is thicker than said first and second rotor discs, such that during braking operations employing the brake disc stack, said first and second rotor discs will distribute pressure more evenly within the brake disc stack than if said first and second rotor discs were as thin as said plurality of rotor discs.

8. The brake disc stack according to claim 7, wherein rates of heat dissipation at said plurality of rotor discs and said plurality of stator discs exceed a rate of heat dissipation at said first and second stator discs.

9. The brake disc stack according to claim 8, wherein said plurality of rotor discs is of a first thickness and said plurality of stator discs is of a second thickness.

10. The brake disc stack according to claim 9, wherein said first and second rotor discs are of a third thickness and said first stator disc is of a fourth thickness.

11. The brake disc stack according to claim 10, wherein said first and second thickness are less than each of said third and fourth thickness.

12. The brake disc stack according to claim 11, wherein said first thickness is less than said second thickness, and said third thickness is less than said fourth thickness.

13. The brake disc stack according to claim 7, wherein said first and second rotor discs have twice the wear thickness of said plurality of additional rotor discs.

14. The brake disc stack according to claim 13, wherein said first stator disc has twice the wear thickness of said plurality of stator discs.

15. The brake disc stack according to claim 14, wherein said wear thickness of said first and second rotor discs and said first stator disc are equal.

* * * * *